United States Patent
Park et al.

(10) Patent No.: US 10,365,875 B2
(45) Date of Patent: Jul. 30, 2019

(54) ELECTRONIC DEVICE FOR CHANGING CLOCK

(71) Applicant: Samsung Electronics Co., Ltd., Suwon-si, Gyeonggi-do (KR)

(72) Inventors: Jin Hyun Park, Gumi-si (KR); Tae Hoon Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/100,021

(22) Filed: Aug. 9, 2018

(65) Prior Publication Data
US 2019/0050188 A1 Feb. 14, 2019

(30) Foreign Application Priority Data
Aug. 9, 2017 (KR) .................. 10-2017-0101179

(51) Int. Cl.
*H04B 7/00* (2006.01)
*H04B 1/38* (2015.01)
*G06F 3/14* (2006.01)
*H04B 1/3827* (2015.01)
*G06F 1/16* (2006.01)

(52) U.S. Cl.
CPC ............ *G06F 3/1415* (2013.01); *G06F 1/163* (2013.01); *H04B 1/3827* (2013.01); *G09G 2370/16* (2013.01)

(58) Field of Classification Search
CPC .. G09G 5/006; G09G 5/008; G09G 2330/021; G09G 2370/16; G06F 1/04; G06F 1/06; G06F 1/08; G06F 1/163; G06F 1/3203; G06F 1/3206; G06F 1/3234; G06F 3/1415; G06F 3/147; H04B 1/3827

USPC ........... 455/41.1, 41.2, 41.3, 90.3, 566, 574, 455/575.1
See application file for complete search history.

(56) References Cited

U.S. PATENT DOCUMENTS

| | | | | |
|---|---|---|---|---|
| 6,848,058 | B1 * | 1/2005 | Sinclair | G06F 1/3203 713/322 |
| 7,359,288 | B2 * | 4/2008 | Auer | G04G 9/0076 368/187 |
| 7,827,424 | B2 * | 11/2010 | Bounitch | G06F 1/3203 713/322 |
| 8,121,656 | B2 * | 2/2012 | Imai | H04W 52/027 455/574 |
| 8,644,782 | B2 | 2/2014 | Tripathi et al. | |
| 9,224,365 | B2 | 12/2015 | Zhao et al. | |
| 9,484,004 | B2 * | 11/2016 | Singh | G09G 5/363 |
| 9,564,910 | B2 * | 2/2017 | Yang | H03L 1/027 |
| 9,582,060 | B2 * | 2/2017 | Balatsos | G06F 1/3203 |
| 2013/0120037 | A1 | 5/2013 | Tripathi et al. | |
| 2014/0218352 | A1 | 8/2014 | Zhao et al. | |
| 2017/0041086 | A1 | 2/2017 | Park et al. | |

FOREIGN PATENT DOCUMENTS

KR  10-2013-0054132 A  5/2013
KR  10-2017-0016255 A  2/2017

* cited by examiner

*Primary Examiner* — Quochien B Vuong

(57) ABSTRACT

An electronic device includes a housing, a display panel, a clock generator, a first processor, a graphic RAM, a controller, an antenna element, a second processor, and a memory. The first processor is configured to generate a clock which does not interfere with harmonics of frequencies at which the electronic device transmits or receives signals through the antenna element.

20 Claims, 8 Drawing Sheets

ELECTRONIC DEVICE FOR CHANGING CLOCK

CROSS-REFERENCE TO RELATED APPLICATION AND CLAIM OF PRIORITY

This application is based on and claims priority under 35 U.S.C. § 119 to Korean Patent Application No. 10-2017-0101179, filed on Aug. 9, 2017, in the Korean Intellectual Property Office, the disclosure of which is incorporated by reference herein its entirety.

BACKGROUND

1. Field

The present disclosure relates to a technology for changing a clock of components included in an electronic device.

2. Description of Related Art

An electronic device, which may communicate with an external device, such as a smartphone, a wearable device, or the like has been widely supplied as mobile communication technologies develop. An antenna may be mounted on the electronic device for the purpose of communicating with the external device. For example, the electronic device may receive a message, a photo, a video, and the like from the external device through the antenna.

Meanwhile, a display may be mounted on the electronic device for the purpose of providing a user with various kinds of data received from the external device. For example, the electronic device may output the received message, photo, and video through the display, and the user may read (or check) the message and may view the photo and the video.

The above information is presented as background information only to assist with an understanding of the present disclosure. No determination has been made, and no assertion is made, as to whether any of the above might be applicable as prior art with regard to the present disclosure.

SUMMARY

The display may operate with a given clock (e.g., corresponding to approximately 500 Mbps) for the purpose of outputting a message, a photo, a video, and the like. When the display operates with the clock, a harmonic may be generated at the display. However, the harmonic may act as a noise in a frequency band of a signal which the antenna transmits/receives. Since the harmonic acts as a noise in the frequency band, the rate at which the antenna transmits/receives a signal may decrease. Also, since the harmonic acts as a noise in the frequency band, the communication of the electronic device with any other electronic device may be adversely affected.

Aspects of the present disclosure are to address at least the above-mentioned problems and/or disadvantages and to provide at least the advantages described below. Accordingly, an aspect of the present disclosure is to provide an electronic device for solving the above-described problem and problems brought up in this specification.

An electronic device according to certain embodiments embodiment of the present disclosure may include a housing that includes a first surface, a second surface facing away from the first surface, and a side surface surrounding a space between the first surface and the second surface, a display panel that is exposed through the first surface, a clock generator that is positioned within the housing and generates a first clock, a first processor that generates first image data and transmits the first image data based on the first clock, a graphic RAM that receives the first image data from the first processor and stores the first image data, a controller that is electrically connected with the graphic RAM, selects at least a portion of the first image data stored in the graphic RAM, and outputs the selected image data on the display panel, an antenna element that includes at least a portion of the housing or is positioned within the housing, a second processor that feeds the antenna element and transmits/receives a signal in a first frequency band based on an electrical path formed through the antenna element, and a memory that stores state data indicating whether a frequency band of a signal which the second processor transmits/receives is changed. The first processor may allow the electronic device to enter a first state, in which at least a part of the first processor is turned off, based on the number of frames through which the selected image data are output, may generate second image data when a specified condition for outputting the second image data is satisfied, may determine whether the second processor transmits/receives a signal in a second frequency band, based on the state data, may set a second clock through the clock generator when the determination result indicates that the frequency band of the signal which the second processor transmits/receives is changed, may allow the electronic device to enter a second state in which the at least a part turned off is turned on, may transmit the second image data to the graphic RAM based on the second clock in the second state, and may output at least a portion of the second image data on the display panel through the controller. The second clock may be mapped onto the second frequency band.

An electronic device according to various embodiments of the present disclosure may include a housing that includes a first surface, a second surface facing away from the first surface, and a side surface surrounding a space between the first surface and the second surface, a display panel that is exposed through the first surface, a clock generator that is positioned within the housing and generates a first clock, a first processor that generates first image data and transmits the first image data based on the first clock, a graphic RAM that receives the first image data from the first processor and stores the first image data, a controller that is electrically connected with the graphic RAM, selects at least a portion of the first image data stored in the graphic RAM, and outputs the selected image data on the display panel, a plurality of antenna elements that include at least a portion of the housing or is positioned within the housing, a second processor that feed at least some of the antenna elements and transmits/receives first group signals based on electrical paths respectively formed through the fed antenna elements, and a memory that stores state data indicating whether a frequency band of signals which the second processor transmits/receives is changed. The first processor may allow the electronic device to enter a first state, in which at least a part of the first processor is turned off, based on the number of frames through which the selected image data are output, may generate second image data when a specified condition for outputting the second image data is satisfied, may determine whether the second processor receives second group signals, based on the state data, may set a second clock through the clock generator when the determination result indicates that the frequency band of the signals which the second processor transmits/receives is changed, may allow the electronic device to enter a second state in which the at least a part turned off is turned on, may transmit the second image data to the graphic RAM based on the second clock in the second state, and may output at least a portion of the second image data on the display panel through the controller. The second clock may be mapped onto a frequency band of each of the second group signals.

An electronic device according to certain embodiments of the present disclosure may include a housing that includes a first surface, a second surface facing away from the first surface, and a side surface surrounding a space between the first surface and the second surface, a display panel that is exposed through the first surface, at least one processor that generates a first clock and first image data and transmits the first image data based on the first clock, a graphic RAM that receives the first image data from the processor and stores the first image data, a controller that is electrically connected with the graphic RAM, may select at least a portion of the first image data stored in the graphic RAM, and outputs the selected image data on the display panel, and an antenna element that includes at least a portion of the housing or is positioned within the housing and is electrically connected with the at least one processor. The at least one processor may feed the antenna element, may transmit/receive a signal based on an electrical path formed through the antenna element, may allow the electronic device to enter a first state, in which at least a part of the processor is turned off, based on the number of frames through which the selected image data are output, may generate second image data when a specified condition for outputting the second image data is satisfied, may determine whether a frequency band of the signal is changed, may set a second clock when the determination result indicates that the frequency band of the signal is changed, may allow the electronic device to enter a second state in which the at least a part turned off is turned on, may transmit the second image data to the graphic RAM based on the second clock in the second state, and may output at least a portion of the second image data on the display panel through the controller. The second clock may be mapped onto the changed frequency band.

According to embodiments of the present disclosure, the performance of communication may be improved. Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
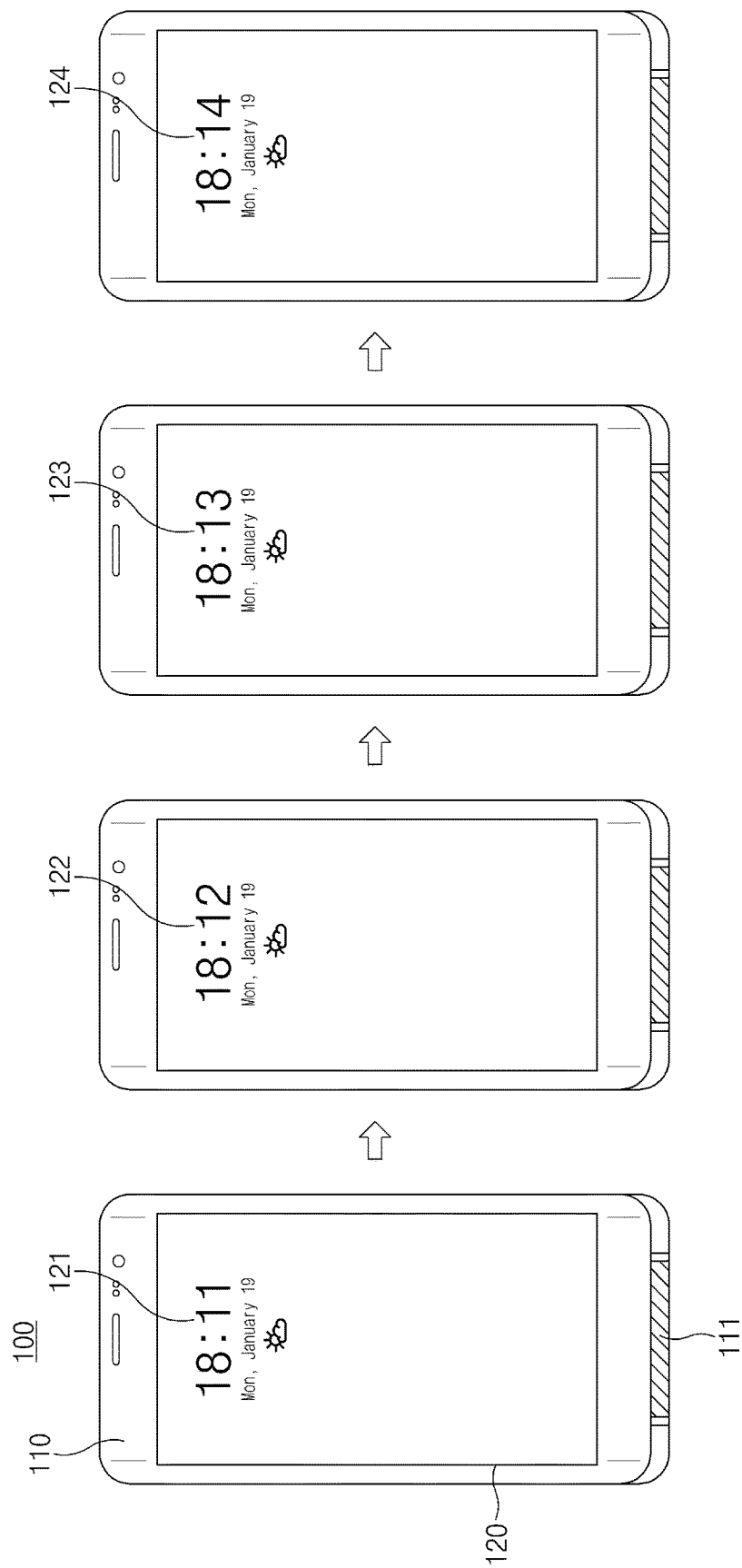
FIG. 1 illustrates an electronic device outputting image data, according to some embodiments.

FIG. 1 illustrates an electronic device outputting image data, according to various embodiments.

Referring to the non-limiting example of FIG. 1, an electronic device 100 may include a housing 110 and a display panel 120.

The housing 110 may form the exterior of the electronic device 100. For example, the housing 110 may include a first surface, a second surface facing away from the first surface, and a side surface surrounding a space between the first surface and the second surface. According to some embodiments, a cover glass may be positioned on the first surface, and a rear cover may be positioned on the second surface. At least a portion of the side surface may operate as an antenna radiator 111 (or an antenna element). Although not illustrated in FIG. 1, the antenna radiator 111 may be positioned within the housing 110. For example, the antenna radiator 111 may be referenced as a laser direct structuring (LDS) antenna positioned within the housing 110.

According to certain embodiments, the electronic device 100 may feed the antenna radiator 111, and may transmit/receive signals in various frequency bands based on an electrical path formed through the antenna radiator 111. For example, the electronic device 100 may transmit/receive a signal in a first frequency band or a signal in a second frequency band through the electrical path.

Although not illustrated in FIG. 1, the electronic device 100 may include a plurality of antenna radiators. The plurality of antenna radiators may include at least a portion of the housing 110, or may be positioned within the housing 110. The electronic device 100 may respectively feed the antenna radiators, and may transmit/receive signals in various frequency bands based on electrical paths respectively formed through the antenna radiators. For example, the electronic device 100 may feed a first antenna radiator (e.g., an antenna radiator for Wi-Fi), and may transmit/receive a signal in the first frequency band based on a first electrical path formed through the first antenna radiator. Also, the electronic device 100 may feed a second antenna radiator (e.g., an antenna radiator for near field communication), and may transmit/receive a signal in the second frequency band based on a second electrical path formed through the second antenna radiator.

The display panel 120 may be exposed through the first surface. That is, the display panel 120 may be exposed through the cover glass positioned on the first surface.

According to various embodiments, the electronic device 100 may output image data through the display panel 120. The image data which are data to be output through the display panel 120 may include, for example, an image, a text, a video, and the like.

According to the non-limiting example of FIG. 1, the electronic device 100 may output image data informing the user of a time. For example, the electronic device 100 may output first image data 121 at 6:11 pm and may output second image data 122 at 6:12 pm. Also, the electronic device 100 may output third image data 123 at 6:13 pm and may output fourth image data 124 at 6:14 pm.

According to some embodiments, for the purpose of changing a frequency band, the electronic device 100 may change a clock for outputting image data. For example, in a state where the first image data 121 are output and a signal in the first frequency band is transmitted/received, the electronic device 100 may transmit/receive a signal in the second frequency band. In this case, the electronic device 100 may change the clock to output the second image data 122. That is, in the case where the electronic device 100 transmits/receives a signal in any other frequency band while outputting the first image data 121 by using a first clock, the electronic device 100 may switch from the first clock to a second clock and may output the second image data 122 by using the second clock. In the present disclosure, a clock may mean an electrical oscillation applied to components (e.g., an application processor 210 of FIG. 2) included in the electronic device 100 for the purpose of operating the components at a given speed.

According to certain embodiments, the first image data 121 to the fourth image data 124 illustrated in FIG. 1 may be stored in the electronic device 100, or may be generated at relevant times. For example, at 6:11 pm, the electronic device 100 may select the first image data 121 stored in a memory (e.g., a graphic RAM 235) and may output the first image data 121 through the display panel 120. According to other embodiments, the electronic device 100 may generate the first image data 121 at 6:11 pm and may output the first image data 121 through the display panel 120.

Figure 2:
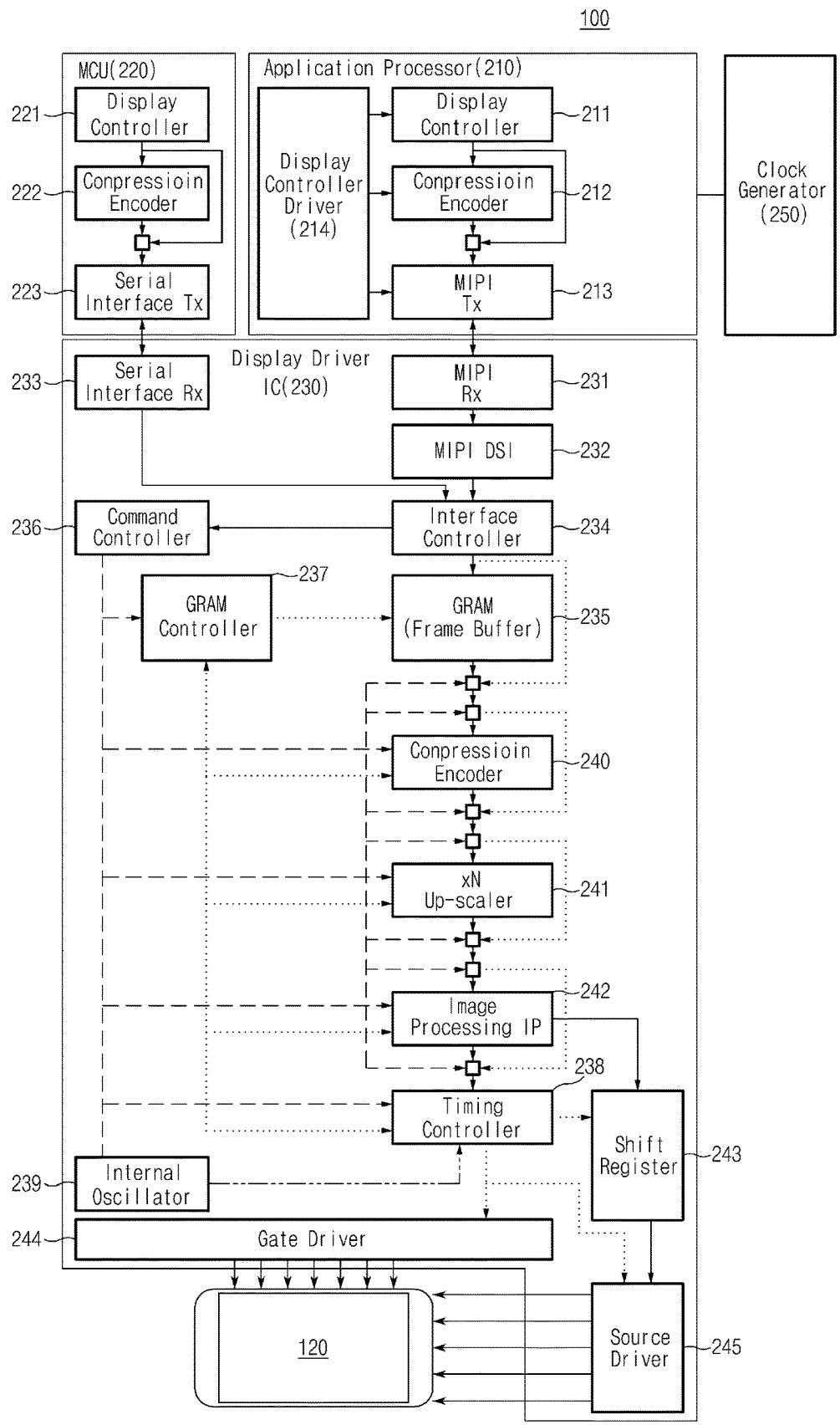
FIG. 2 illustrates, in block diagram format, an electronic device according to certain embodiments.

FIG. 2 illustrates, in block diagram format, an electronic device according to various embodiments.

Referring to the non-limiting example of FIG. 2, the electronic device 100 may include an application processor (AP) 210, a micro control unit (MCU) 220, a display driver integrated circuit (DDI) 230, a clock generator 250, or a display panel 120.

The clock generator 250 may generate a clock. According to some embodiments, unlike illustration in FIG. 2, the clock generator 250 may be included in the application processor 210.

The application processor 210 may include a display controller 211, a compression encoder 212, a mobile industry processor interface (MIPI) transmit module 213, or a display controller driver 214.

The display controller 211 may generate image data.

The compression encoder 212 may encode the image data in a specified manner. According to certain embodiments, the process of encoding the image data may be skipped or detoured.

The MIPI transmit module 213 may transmit the encoded image data and/or unencoded image data to the display driver IC 230. According to various embodiments, the MIPI transmit module 213 may transmit image data to the display driver IC 230, based on a clock generated by the clock generator 250.

The display controller driver 214 may be electrically connected with the display controller 211, the compression encoder 212, or the MIPI transmit module 213, respectively.

According to some embodiments, the display controller driver 214 may control a turn-on or turn-off of the display controller 211, the compression encoder 212, the MIPI transmit module 213, or the clock generator 250. For example, the display controller driver 214 may determine whether the number of frames through which the specific image data (e.g., the first image data 121 of FIG. 1) are output is not smaller than a specified number. When the number of the frames for the output of the specific image data is not smaller than the specified number, the display controller driver 214 may turn off the display controller 211, the compression encoder 212, the MIPI transmit module 213, or the clock generator 250. In the present disclosure, a state where the display controller 211, the compression encoder 212, the MIPI transmit module 213, or the clock generator 250 is turned off may be referenced as a first state or a low-power mode. A frame may mean a minimum unit of a screen in which image data may be output.

According to certain embodiments, the electronic device 100 may generate new image data when a specified condition is satisfied. The specified condition may include the case where a touch input of a user intending to change a screen is made, the case where a time is changed, or the like. In the embodiment illustrated in FIG. 1, the specified condition may be satisfied when a time is changed from 6:11 pm to 6:12 pm. The new image data may mean image data which are different from the image data being output before the electronic device 100 enters the first state. For example, assuming that the first image data 121 are being output before the electronic device 100 enters the first state, the display controller driver 214 may generate the second image data 122 in the first state.

The display controller driver 214 may determine whether a signal which the electronic device 100 transmits/receives in the first state is changed. When the signal is changed, the display controller driver 214 may set a new clock. For example, assuming that a first clock is being output before the electronic device 100 enters the first state, the display controller driver 214 may set a second clock.

According to various embodiments, the display controller driver 214 may determine whether a signal which the electronic device 100 transmits/receives before entering the first state is changed. For example, a signal which the electronic device 100 transmits/receives before entering the first state may be changed. The display controller driver 214 may determine whether a signal is changed, immediately at a time point when the signal is changed.

Figure 6:
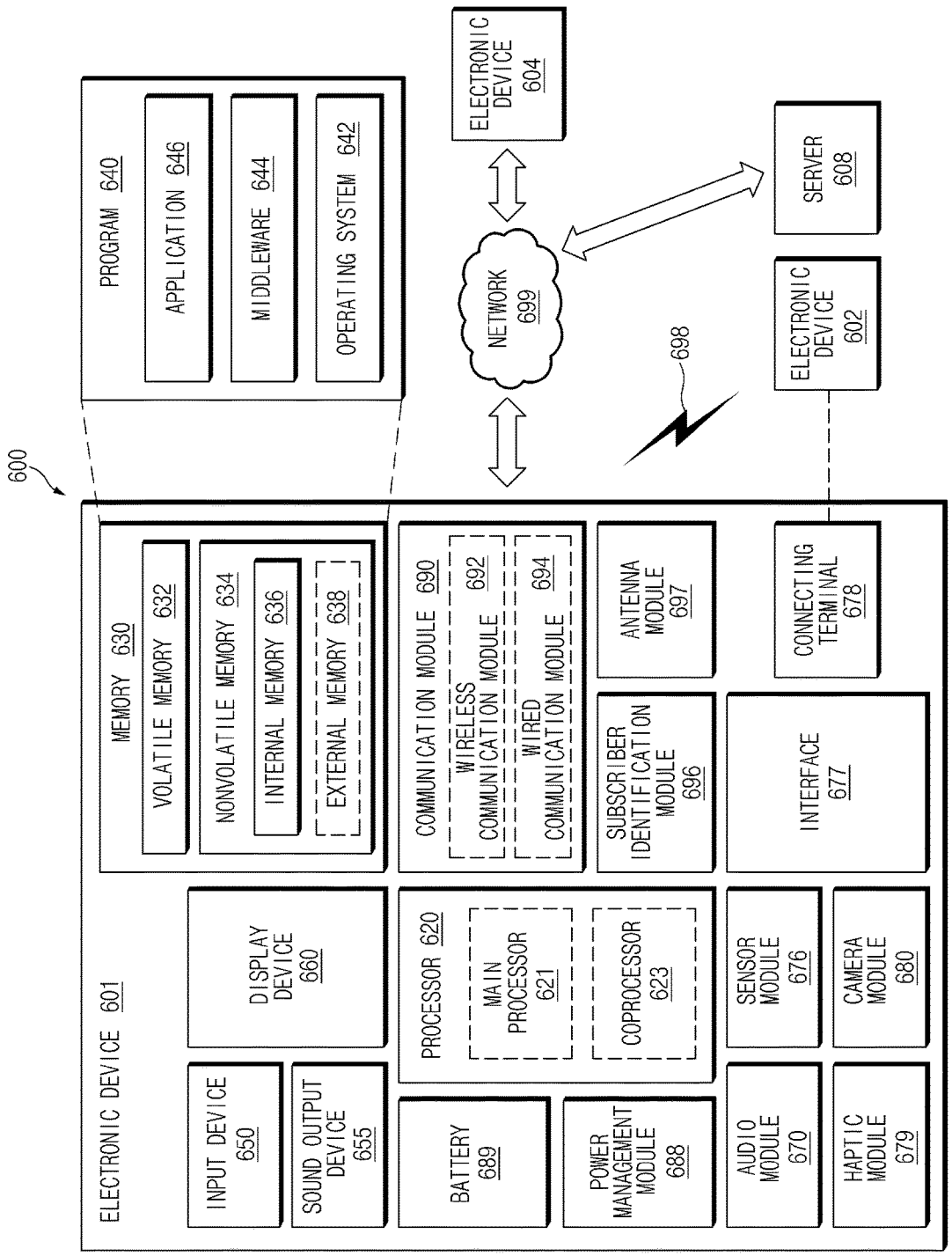
FIG. 6 illustrates, in block diagram format, an electronic device in a network environment according to various embodiments.

According to some embodiments, the electronic device 100 may further include a memory (e.g., 630 of FIG. 6). The memory may store state data indicating whether a frequency band of a signal which the electronic device 100 transmits/receives is changed. The state data may be updated in real time whenever a frequency band is changed. The display controller driver 214 may determine whether a signal which the electronic device 100 transmits/receives is changed, based on the state data.

According to certain embodiments, the display controller driver 214 may enter a second state (or an active mode). The second state may comprise a state where the display controller 211, the compression encoder 212, the MIPI transmit module 213, or the clock generator 250 is again turned on. When the display controller 211, the compression encoder 212, the MIPI transmit module 213, or the clock generator 250 is turned on, the MIPI transmit module 213 may transmit the second image data 122 to the display driver IC 230, based on the second clock.

The micro control unit 220 may include a display controller 221, a compression encoder 222, and a serial interface transmit module 223. The display controller 221 may generate control information for selecting or controlling image data to be output to the display panel 120. The compression encoder 222 may encode the generated control information. According to various embodiments, the process of encoding the control information may be skipped or detoured. The serial interface transmit module 223 may transmit the encoded control information or unencoded control information to the display driver IC 230. According to certain embodiments, the micro control unit 220 may be included in the application processor 210.

The display driver IC 230 may include an MIPI receive module 231, an MIPI display serial interface 232, a serial interface receive module 233, an interface controller 234, the graphic RAM (GRAM) 235, a command controller 236, a graphic RAM (GRAM) controller 237, a timing controller 238, an internal oscillator 239, a compression encoder 240, an up-scaler 241, an image processing IP 242, a shift register 243, a gate driver 244, or a source driver 245.

The MIPI receive module 231 may receive encoded or unencoded image data image data from the MIPI transmit module 213.

The MIPI display serial interface 232 may set an address of the graphic RAM 235, at which the image data received by the MIPI receive module 231 will be stored.

The serial interface receive module 233 may receive encoded or unencoded control information from the serial interface transmit module 223.

The interface controller 234 may control the graphic RAM 235 so as to store image data. According to some embodiments, the interface controller 234 may control the graphic RAM 235 such that the image data are stored at the address set by the MIPI display serial interface 232. Also, the interface controller 234 may transmit the control information to the command controller 236.

The graphic RAM 235 may store the encoded or unencoded image data image data. In this case, the graphic RAM 235 may store the image data at the address set by the MIPI display serial interface 232.

The command controller 236 may control the graphic RAM controller 237, the timing controller 238, and the internal oscillator 239, based on the control information. For example, the command controller 236 may control the graphic RAM controller 237 so as to select at least a portion of the image data stored in the graphic RAM 235. Also, the command controller 236 may allow the timing controller 238 to control driving timings of the gate driver 244 and the source driver 245. A signal for controlling the timing controller 238 may be directly transmitted to the timing controller 238, or may be transmitted to the timing controller 238 through the internal oscillator 239.

The graphic RAM controller 237 may select at least a portion of the image data stored in the graphic RAM 235. For example, the graphic RAM controller 237 may select at least a portion of the image data, based on an address of the image data and/or the size of the image data.

The compression encoder 240 may encode the selected image data. The size of the selected image data may be reduced through the encoding process.

The up-scaler 241 may enlarge the image data at a specified magnification.

The image processing IP 242 may improve the image quality of the image data. According to various embodiments, the image processing IP 242 may include a pixel data processing circuit, a pre-processing circuit, a gating circuit, or the like.

The shift register 243 may change a location of a display, at which image data will be output.

The gate driver 244 and the source driver 245 may apply a gate signal and a data signal to the display panel 120 to allow pixels in the display panel 120 to emit light.

The display panel 120 may output image data.

According to certain embodiments of the present disclosure, the description given with reference to FIGS. 1 and 2 may be applied to components which have the same reference numerals (or marks) as the electronic device 100 illustrated in FIGS. 1 and 2.

Figure 3:
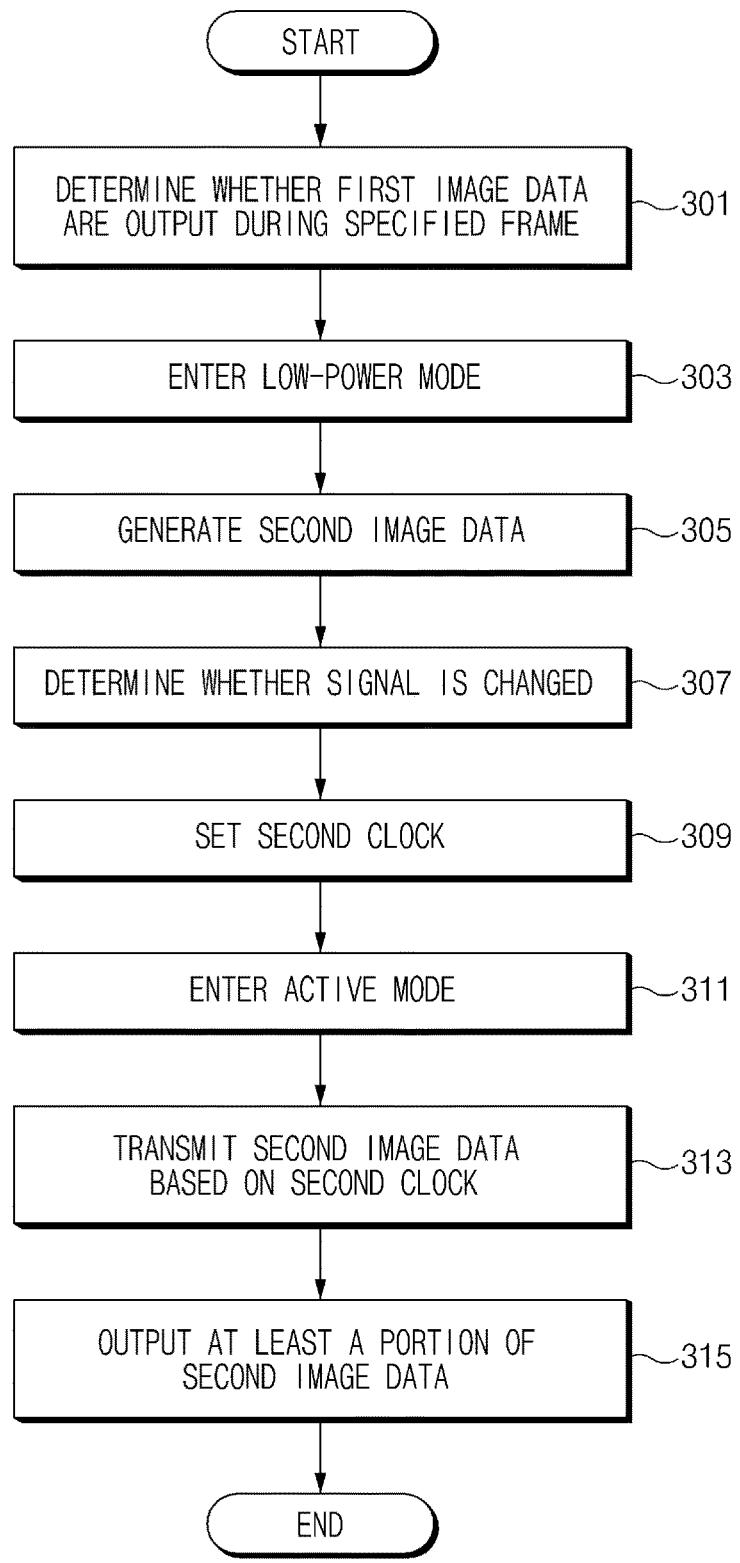
FIG. 3 illustrates operations of a method according to various embodiments.

FIG. 3 illustrates operations of an electronic device according to certain embodiments.

Referring to the non-limiting example of FIG. 3, in operation 301, the electronic device 100 may determine whether the number of frames through which specific image data are output is not smaller than a specified number. For example, whether first image data are output during three or more frames may be determined. When the number of the frames is smaller than the specified number, the electronic device 100 may wait until the specific image data are output during frames of the specific number or more. When the number of the frames is not smaller than the specified number, the electronic device 100 may perform operation 303.

In operation 303, the electronic device 100 may enter the low-power mode. The low-power mode may mean a state where a part of the application processor 210 is turned off. For example, when the electronic device 100 enters the low-power mode, at least one of the display controller 211, the compression encoder 212, the MIPI transmit module 213, or the clock generator 250 may be turned off.

In operation 305, the electronic device 100 may generate new image data. For example, the electronic device 100 may generate second image data in the low-power mode.

In operation 307, the electronic device 100 may determine whether a transmit/receive signal is changed. For example, the electronic device 100 may determine whether a signal in a second frequency band (or second group signals) is transmitted/received while a signal in a first frequency band (or first group signals) is transmitted/received. According to various embodiments, the electronic device 100 may determine whether the signal is changed, based on state data stored in a memory (e.g., memory 630 of FIG. 6).

According to some embodiments, operation 307 may be performed before the electronic device 100 enters the low-power mode. For example, the electronic device 100 may change a transmit/receive signal before entering the low-power mode. In such cases, the electronic device 100 may recognize that a signal is changed, at a time point when the signal is changed.

In operation 309, the electronic device 100 may generate a new clock. For example, assuming that the electronic device 100 generates a first clock (e.g., a clock corresponding to 500 Mbps) before entering the low-power mode, the electronic device 100 may set a second clock (e.g., a clock corresponding to 400 Mbps) in the low-power mode.

In operation 311, the electronic device 100 may enter an active mode from the low-power mode. The active mode may mean a state where components turned off in the low-power mode are again turned on. For example, assuming that the display controller 211, the compression encoder 212, the MIPI transmit module 213, or the clock generator 250 is turned off in the low-power mode, the display controller 211, the compression encoder 212, the MIPI transmit module 213, or the clock generator 250 may be turned on in the active mode.

In operation 313, the application processor 210 may transmit the second image data to the display driver IC 230, based on the second clock. The second data transmitted to the display driver IC 230 may be stored in the graphic RAM 235.

In operation 315, the display driver IC 230 may output at least a portion of the second image data to the display panel 120.

Figure 4:
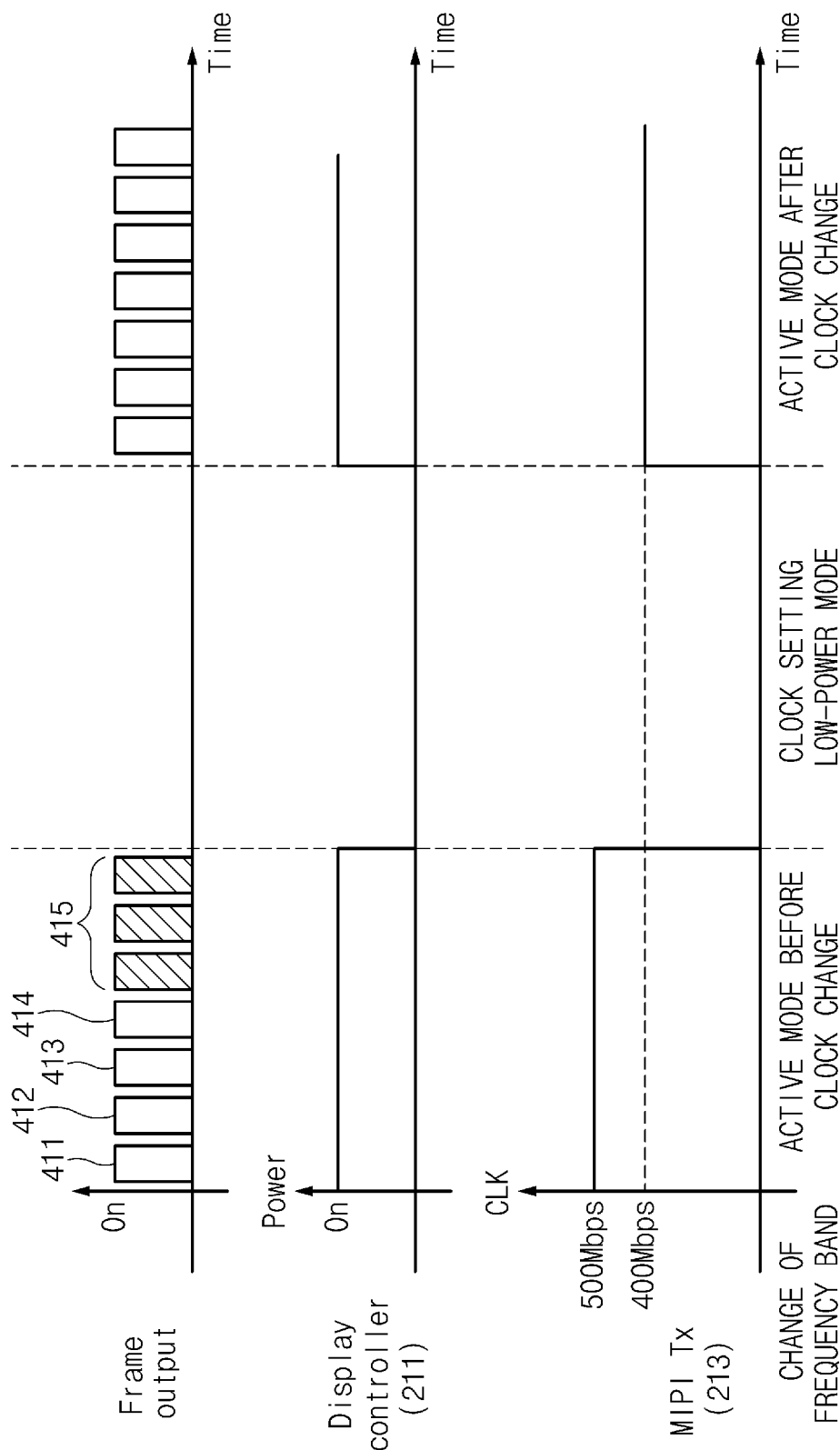
FIG. 4 illustrates a timing diagram of an electronic device according to some embodiments.

FIG. 4 illustrates a timing diagram of an electronic device according to certain embodiments.

Referring to the non-limiting example of FIG. 4, the electronic device 100 may determine whether the number of frames through which specific image data are output is not smaller than a specified number (e.g., 3). At this time, the display controller 211, the clock generator 250, or the MIPI transmit module 213 may be in a turn-on state. That is, the display controller 211 may generate image data, and the clock generator 250 may generate a clock corresponding to approximately 500 Mbps. The MIPI transmit module 213 may transmit the image data, which the display controller 211 generates at approximately 500 Mbps, to the display driver IC 230.

According to various embodiments, when the number of the frames for the output of the same image data is not smaller than the specified number, the electronic device 100 may enter the low-power mode. For example, first image data may be output through a first frame 411, second image data may be output through a second frame 412, third image data may be output through a third frame 413, fourth image data may be output through a fourth frame 414, and fifth image data may be output through first group frames 415. Since each of the first image data to the fourth image data is output through one frame, the electronic device 100 may not enter the low-power mode while the first image data to the fourth image data are output. However, since the fifth image data are identically output during three frames, the electronic device 100 may determine that image data to be updated do not exist and may enter the low-power mode.

When the electronic device 100 enters the low-power mode, the electronic device 100 may turn off the display controller 211, the clock generator 250, or the MIPI transmit module 213. Since the MIPI transmit module 213 is turned off, the MIPI transmit module 213 may not transmit image data to the display driver IC 230.

When a specified condition is satisfied in the low-power mode, the electronic device 100 may generate sixth image data. The sixth image data may be any one of the first image data to the fifth image data, and may be image data having the relation with the fifth image data. For example, in the case where the fifth image data are a clock image indicating 6:11 pm, the electronic device 100 may generate the sixth image data (e.g., a clock image indicating 6:12 pm) at 6:12 pm.

According to some embodiments, the electronic device 100 may determine whether a transmit/receive signal is changed. When the signal is changed, the electronic device 100 may set a clock corresponding to the changed signal. The clock corresponding to the changed signal will be described with reference to Table 1, below.

TABLE 1

| LTE | WIFI | BT | GPS | Optimal clock (corresponding to Mbps) |
| --- | --- | --- | --- | --- |
| ON | OFF | OFF | OFF | 500 |
| ON | OFF | OFF | ON | 480 |
| ON | OFF | ON | OFF | 520 |
| ON | OFF | ON | ON | 500 |
| ON | ON | OFF | OFF | 500 |
| ON | ON | OFF | ON | 480 |
| ON | ON | ON | OFF | 520 |
| ON | ON | ON | ON | 500 |

Referring to Table 1, when the electronic device 100 transmits/receives both an LTE signal and a GPS signal while transmitting/receiving the LTE signal, the electronic device 100 may set a clock from a value (or a frequency) corresponding to 500 Mbps to a value (or a frequency) corresponding to 480 Mbps. In another embodiment, when the electronic device 100 transmits/receives both the LTE signal and a Wi-Fi signal while transmitting/receiving the LIE signal, the electronic device 100 may maintain the clock.

According to certain embodiments, the electronic device 100 may again enter the active mode. In the active mode, the electronic device 100 may again turn on components which have been turned off. In the above exemplification, the electronic device 100 may again turn on the display controller 211, the clock generator 250, or the MIPI transmit module 213. Since the clock generator 250 and the MIPI transmit module 213 are turned on, the clock generator 250 may generate the clock (e.g., corresponding to approximately 400 Mbps) set in the low-power mode. The MIPI transmit module 213 may transmit the sixth image data to the display driver IC 230, based on the clock (e.g., corresponding to approximately 400 Mbps) set in the low-power mode. In the case where the sixth image data are transmitted, the electronic device 100 may select at least a portion of the sixth image data and may output the selected image data through the display panel 120.

Figure 5A:
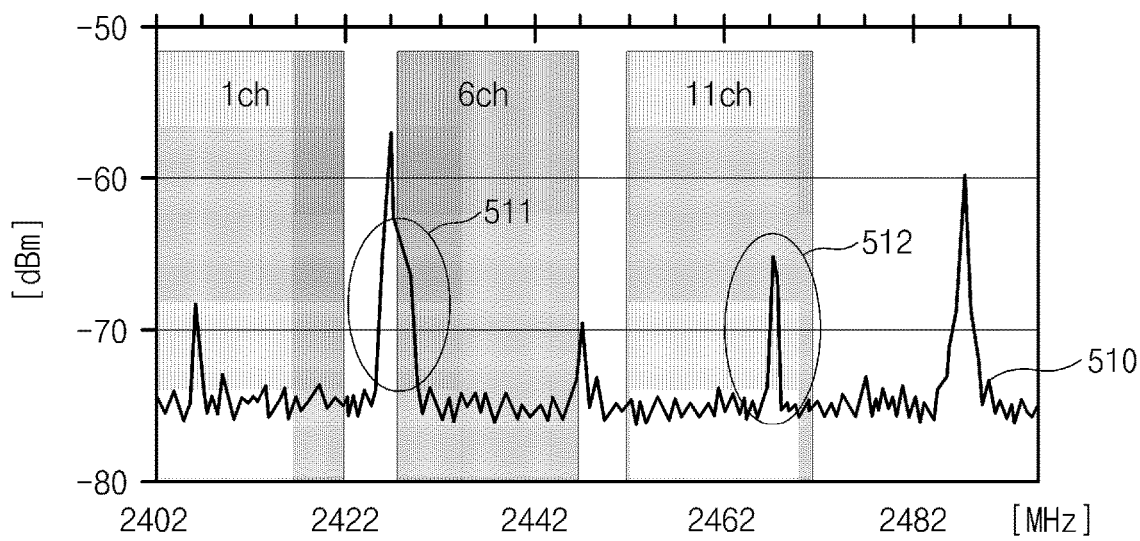
FIG. 5A illustrates a Wi-Fi communication band and a harmonic generated at a display, according to certain embodiments.
Figure 5B:
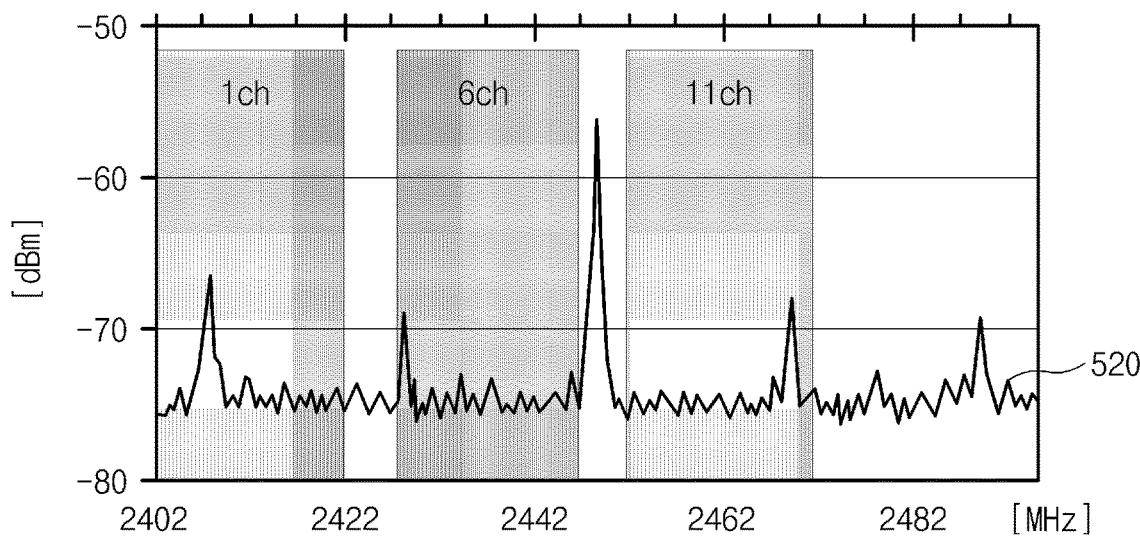
FIG. 5B illustrates a Wi-Fi communication band and a harmonic generated at a display, according to another embodiment.
Figure 5C:
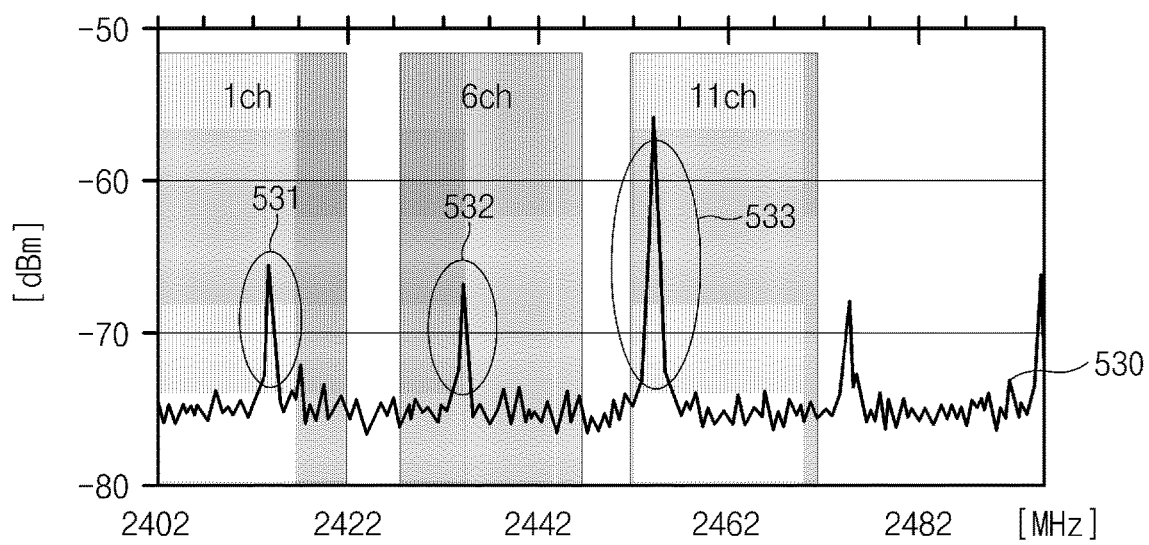
FIG. 5C illustrates a Wi-Fi communication band and a harmonic generated at a display, according to another embodiment.
Figure 5D:
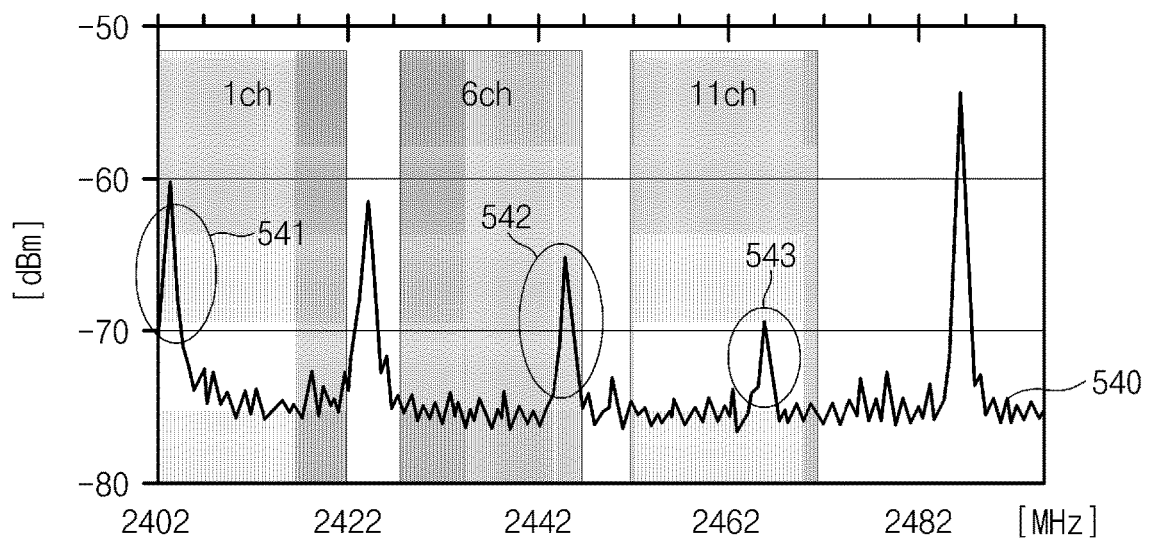
FIG. 5D illustrates a Wi-Fi communication band and a harmonic generated at a display, according to another embodiment.

FIG. 5A illustrates a Wi-Fi communication band and a harmonic generated at a display, according to various embodiments. FIG. 5B illustrates a Wi-Fi communication band and a harmonic generated at a display, according to another embodiment. FIG. 5C illustrates a Wi-Fi communication band and a harmonic generated at a display, according to another embodiment. FIG. 5D is a view illustrating a Wi-Fi communication band and a harmonic generated at a display, according to another embodiment.

A harmonic 510 illustrated in FIG. 5A indicates a harmonic in the case where a clock corresponds to 485 Mbps. A harmonic 520 illustrated in FIG. 53 indicates a harmonic in the case where a clock corresponds to 489 Mbps. A harmonic 530 illustrated in FIG. 5C indicates a harmonic in the case where a clock corresponds to 490 Mbps. A harmonic 540 illustrated in FIG. 5D indicates a harmonic in the case where a clock corresponds to 497 Mbps.

Referring to the non-limiting example of FIG. 5A, for harmonic 510, a first region 511 may overlap with channel 6, and a second region 512 may overlap with channel 11. As such, the harmonic 510 may be noise in channel 6 and channel 11.

Referring to FIG. 5B, a partial region of the harmonic 520 may be noise in channel 1, channel 6, or channel 11, but the portion, which acts as a noise, of the harmonic 520 may be relatively insignificant compared to the example shown in FIG. 5A.

Referring to the non-limiting example shown in FIG. 5C, for harmonic 530, a first region 531 may overlap with channel 1, a second region 532 may overlap with channel 6, and a third region 533 may overlap with channel 11. As such, the harmonic 530 may be noise in channel 1, channel 6, and channel 11.

Referring to the example shown in FIG. 5D, for harmonic 540, a first region 541 may overlap with channel 1, a second region 542 may overlap with channel 6, and a third region 543 may overlap with channel 11. As such, harmonic 540 may be noise in channel 1, channel 6, and channel 11.

As illustrated in FIGS. 5A through 5D, in the case where a clock corresponds to 489 Mbps, the harmonic 520 may have a relatively insignificant influence on a Wi-Fi frequency band. Accordingly, in the case where the electronic device 100 transmits/receives a signal in the Wi-Fi frequency band, the electronic device 100 may set a clock to a value (or a frequency) corresponding to 489 Mbps, and may transmit image data to the graphic RAM 235 at 489 Mbps.

The electronic device 100 according to some embodiments of the present disclosure may include a housing 110 that includes a first surface, a second surface facing away from the first surface, and a side surface surrounding a space between the first surface and the second surface, a display panel 120 that is exposed through the first surface, a clock generator 250 that is positioned within the housing 110 and generates a first clock, a first processor 210 that generates first image data and transmits the first image data based on the first clock, a graphic RAM 235 that receives the first image data from the first processor 210 and stores the first image data, a GRAM controller 237 or command controller 236 that is electrically connected with the graphic RAM 235, selects at least a portion of the first image data stored in the graphic RAM 235, and outputs the selected image data on the display panel 120, an antenna element that includes at least a portion of the housing 110 or is positioned within the housing 110, a second processor 690 that feeds the antenna element and transmits/receives a signal in a first frequency band based on an electrical path formed through the antenna element, and a memory 630 that stores state data indicating whether a frequency band of a signal which the second processor transmits/receives is changed. The first processor 210 may allow the electronic device to enter a first state, in which at least a part of the first processor 210 is turned off, based on the number of frames through which the selected image data are output, may generate second image data when a specified condition for outputting the second image data is satisfied, may determine whether the second processor 210 transmits/receives a signal in a second frequency band, based on the state data, may set a second clock through the clock generator 250 when the determination result indicates that the frequency band of the signal which the second processor 690 transmits/receives is changed, may allow the electronic device 100 to enter a second state in which the at least a part turned off is turned on, may transmit the second image data to the graphic RAM 235 based on the second clock in the second state, and may output at least a portion of the second image data on the display panel through the controller. The second clock may be mapped onto the second frequency band. The "second processor" may be referred to as "a communication module" shown in FIG. 6.

The first processor 210 according to some embodiments of the present disclosure may allow the electronic device 100 to enter the first state when the number of the frames is not smaller than a specified number.

The first processor 210 according to some embodiments of the present disclosure may include a display controller 211 that generates the first image data, a transmit module 213 that transmits the first image data to the graphic RAM 235, and a display controller driver 214 that is electrically connected with the display controller 211 and the transmit module 213.

The display controller driver 214 according to certain embodiments of the present disclosure may be configured to turn off the display controller 211 and the transmit module 213 when the electronic device 100 enters the first state.

The display controller driver 214 according to various embodiments of the present disclosure may be configured to generate the second data and set the second clock when the electronic device 100 enters the first state.

The display controller driver 214 according to some embodiments of the present disclosure may be configured to turn on the display controller 211 and the transmit module 213 when the electronic device 100 enters the second state.

According to certain embodiments of the present disclosure, in the second state, the transmit module 213 may transmit the second image data to the graphic RAM 235 based on the second clock.

The memory 630 according to various embodiments of the present disclosure may store a table in which clocks to be generated by the clock generator 250 are mapped onto frequency bands of a signal to be transmitted/received by the second processor 690.

The first processor 210 according to some embodiments of the present disclosure may set the second clock based on the table.

The first processor 210 according to certain embodiments of the present disclosure may correspond to an application processor, and the second processor 690 may correspond to a communication processor.

The first processor 210 according to various embodiments of the present disclosure may generate the second image data based on a user input for outputting the second image data.

The electronic device 100 according to some embodiments of the present disclosure may include a housing 110 that includes a first surface, a second surface facing away from the first surface, and a side surface surrounding a space between the first surface and the second surface, a display panel 120 that is exposed through the first surface, a clock generator 250 that is positioned within the housing and generates a first clock, a first processor 210 that generates first image data and transmits the first image data based on the first clock, a graphic RAM 235 that receives the first image data from the first processor 210 and stores the first image data, a controller that is electrically connected with the graphic RAM 235, selects at least a portion of the first image data stored in the graphic RAM 235, and outputs the selected image data on the display panel, a plurality of antenna elements that include at least a portion of the housing 110 or positioned within the housing 110, a second processor 690 that feeds at least some of the antenna elements and transmits/receives first group signals based on electrical paths respectively formed through the fed antenna elements, and a memory 630 that stores state data indicating whether a frequency band of signals which the second processor transmits/receives is changed. The first processor 210 may allow the electronic device 100 to enter a first state, in which at least a part of the first processor 210 is turned off, based on the number of frames through which the selected image data are output, may generate second image data when a specified condition for outputting the second image data is satisfied, may determine whether the second processor 690 transmits/receives second group signals, based on the state data, may set a second clock through the clock generator 250 when the determination result indicates that the frequency band of the signals which the second processor 690 transmits/receives is changed, may allow the electronic device 100 to enter a second state in which the at least a part turned off is turned on, may transmit the second image data to the graphic RAM 235 based on the second clock in the second state, and may output at least a portion of the second image data on the display panel 120 through the controller. The second clock may be mapped onto a frequency band of each of the second group signals.

The side surface according to certain embodiments of the present disclosure may include a first edge facing a first direction and having a first length, a second edge being in parallel with the first edge and having the first length, a third edge connecting one end of the first edge and one end of the second edge, and a fourth edge being in parallel with the third edge and connecting an opposite end of the first edge and an opposite end of the second edge, and the antenna elements may include a first antenna element including at least a portion of the first edge, and a second antenna element including at least a portion of the second edge.

The second processor 690 according to various embodiments of the present disclosure may transmit/receive a signal in a first frequency band based on a first electrical path formed through the first antenna element, and may transmit/receive a signal in a second frequency band based on a second electrical path formed through the second antenna element.

The electronic device 100 according to some embodiments of the present disclosure may further include a camera module interposed between the first surface and the second surface, and the antenna elements may include a coil-type antenna element surrounding the camera module.

The first processor 210 according to certain embodiments of the present disclosure may include a display controller 211 that generates the first image data, a transmit module 213 that transmits the first image data to the graphic RAM 235, and a display controller driver 214 that is electrically connected with the display controller 211 and the transmit module 213.

The display controller driver 214 according to various embodiments of the present disclosure may be configured to turn off the display controller 211 and the transmit module 213 when the electronic device 100 enters the first state.

The electronic device 100 according to some embodiments of the present disclosure may include a housing 110 that includes a first surface, a second surface facing away from the first surface, and a side surface surrounding a space between the first surface and the second surface, a display panel 120 that is exposed through the first surface, at least one processor that generates a first clock and first image data and transmits the first image data based on the first clock, a graphic RAM 235 that receives the first image data from the processor and stores the first image data, a controller that is electrically connected with the graphic RAM, may select at least a portion of the first image data stored in the graphic RAM 235, and outputs the selected image data on the display panel 120, an antenna element that includes at least a portion of the housing 110 or is positioned within the housing 110 and is electrically connected with the at least one processor. The at least one processor may feed the antenna element, may transmit/receive a signal based on an electrical path formed through the antenna element, may allow the electronic device 100 to enter a first state, in which at least a part of the processor is turned off based on the number of frames through which the selected image data are output, may generate second image data when a specified condition for outputting the second image data is satisfied, may determine whether a frequency band of the signal is changed, may set a second clock when the determination result indicates that the frequency band of the signal is changed, may allow the electronic device 100 to enter a second state in which the at least a part turned off is turned on, may transmit the second image data to the graphic RAM 235 based on the second clock in the second state, and may output at least a portion of the second image data on the display panel 120 through the controller. The second clock may be mapped onto the changed frequency band.

The at least one processor according to certain embodiments of the present disclosure may include at least one of an application processor and a communication processor.

The at least one processor according to various embodiments of the present disclosure may include a clock generator 250 configured to generate the first clock and the second clock.

FIG. 6 illustrates, in block diagram format, an electronic device in a network environment according to various embodiments.

Referring to the non-limiting example of FIG. 6, an electronic device 601 (e.g., the electronic device 100 of FIG. 1) may communicate with an electronic device 602 through a first network 698 (e.g., a short-range wireless communication) or may communicate with an electronic device 604 or a server 608 through a second network 699 (e.g., a long-distance wireless communication) in a network environment 600. According to some embodiments, the electronic device 601 may communicate with the electronic device 604 through the server 608. According to certain embodiments, the electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module 696, and an antenna module 697. According to some embodiments, at least one (e.g., the display device 660 or the camera module 680) among components of the electronic device 601 may be omitted or other components may be added to the electronic device 601. According to some embodiments, some components may be integrated and implemented as in the case of the sensor module 676 (e.g., a fingerprint sensor, an iris sensor, or an illuminance sensor) embedded in the display device 660 (e.g., a display).

The processor 620 may operate, for example, software (e.g., a program 640) to control at least one of other components (e.g., a hardware or software component) of the electronic device 601 connected to the processor 620 and may process and compute a variety of data. The processor 620 may load a command set or data, which is received from other components (e.g., the sensor module 676 or the communication module 690), into a volatile memory 632, may process the loaded command or data, and may store result data into a nonvolatile memory 634. According to various embodiments, the processor 620 may include a main processor 621 (e.g., a central processing unit or an application processor) and an coprocessor 623 (e.g., a graphic processing device, an image signal processor, a sensor hub processor, or a communication processor), which operates independently from the main processor 621, additionally or alternatively uses less power than the main processor 621, or is specified to a designated function. In this case, the coprocessor 623 may operate separately from the main processor 621 or embedded.

In this case, the coprocessor 623 may control, for example, at least some of functions or states associated with at least one component (e.g., the display device 660, the sensor module 676, or the communication module 690) among the components of the electronic device 601 instead of the main processor 621 while the main processor 621 is in an inactive (e.g., sleep) state or together with the main processor 621 while the main processor 621 is in an active (e.g., an application execution) state. According to some embodiments, the coprocessor 623 (e.g., the image signal processor or the communication processor) may be implemented as a part of another component (e.g., the camera module 680 or the communication module 690) that is functionally related to the coprocessor 623. The memory 630 may store a variety of data used by at least one component (e.g., the processor 620 or the sensor module 676) of the electronic device 601, for example, software (e.g., the program 640) and input data or output data with respect to commands associated with the software. The memory 630 may include the volatile memory 632 or the nonvolatile memory 634.

The program 640 may be stored in the memory 630 as software and may include, for example, an operating system 642, a middleware 644, or an application 646.

The input device 650 may be a device for receiving a command or data, which is used for a component (e.g., the processor 620) of the electronic device 601, from an outside (e.g., a user) of the electronic device 601 and may include, for example, a microphone, a mouse, or a keyboard.

The sound output device 655 may be a device for outputting a sound signal to the outside of the electronic device 601 and may include, for example, a speaker used for general purposes, such as multimedia play or recordings play, and a receiver used only for receiving calls. According to certain embodiments, the receiver and the speaker may be either integrally or separately implemented.

The display device 660 may be a device for visually presenting information to the user and may include, for example, a display, a hologram device, or a projector and a control circuit for controlling a corresponding device. According to various embodiments, the display device 660 may include a touch circuitry or a pressure sensor for measuring an intensity of pressure on the touch.

The audio module 670 may convert a sound into an electrical signal, and also convert an electrical signal into a sound. According to some embodiments, the audio module 670 may obtain the sound through the input device 650 or may output the sound through an external electronic device (e.g., the electronic device 602 (e.g., a speaker or a headphone)) wired or wirelessly connected to the sound output device 655 or the electronic device 601.

The sensor module 676 may generate an electrical signal or a data value corresponding to an operating state (e.g., power or temperature) inside or an environmental state outside the electronic device 601. The sensor module 676 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 677 may support a designated protocol wired or wirelessly connected to the external electronic device (e.g., the electronic device 602). According to certain embodiments, the interface 677 may include, for example, an HDMI (high-definition multimedia interface), a USB (universal serial bus) interface, an SD card interface, or an audio interface.

A connection terminal 678 may include a connector that physically connects the electronic device 601 to the external electronic device (e.g., the electronic device 602), for example, an HDMI connector, a USB connector, an SD card connector, or an audio connector (e.g., a headphone connector).

The haptic module 679 may convert an electrical signal to a mechanical stimulation (e.g., vibration or movement) or an electrical stimulation perceived by the user through tactile or kinesthetic sensations. The haptic module 679 may include, for example, a motor, a piezoelectric element, or an electric stimulator.

The camera module 680 may shoot a still image or a video image. According to various embodiments, the camera module 680 may include, for example, at least one lens, an image sensor, an image signal processor, or a flash.

The power management module 688 may be a module for managing power supplied to the electronic device 601 and may serve as at least a part of a power management integrated circuit (PMIC).

The battery 689 may be a device for supplying power to at least one component of the electronic device 601 and may include, for example, a non-rechargeable (primary) battery, a rechargeable (secondary) battery, or a fuel cell.

The communication module 690 may establish a wired or wireless communication channel between the electronic device 601 and the external electronic device (e.g., the electronic device 602, the electronic device 604, or the server 608) and support communication execution through the established communication channel. The communication module 690 may include at least one communication processor operating independently from the processor 620 (e.g., the application processor) and supporting the wired communication or the wireless communication. According to some embodiments, the communication module 690 may include a wireless communication module 692 (e.g., a cellular communication module, a short-range wireless communication module, or a GNSS (global navigation satellite system) communication module) or a wired communication module 694 (e.g., an LAN (local area network) communication module or a power line communication module) and may communicate with the external electronic device using a corresponding communication module among them through the first network 698 (e.g., the short-range communication network such as a Bluetooth, a Wi-Fi direct, or an IrDA (infrared data association)) or the second network 699 (e.g., the long-distance wireless communication network such as a cellular network, an internet, or a computer network (e.g., LAN or WAN)). The above-mentioned various communication modules 690 may be implemented into one chip or into separate chips, respectively.

According to certain embodiments, the wireless communication module 692 may identify and authenticate the electronic device 601 using user information stored in the subscriber identification module 696 in the communication network.

The antenna module 697 may include one or more antennas to transmit or receive the signal or power to or from an external source. According to various embodiments, the communication module 690 (e.g., the wireless communication module 692) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to some embodiments, the command or data may be transmitted or received between the electronic device 601 and the external electronic device 604 through the server 608 connected to the second network 699. Each of the electronic devices 602 and 604 may be the same or different types as or from the electronic device 601. According to certain embodiments, all or some of the operations performed by the electronic device 601 may be performed by another electronic device or a plurality of external electronic devices. When the electronic device 601 performs some functions or services automatically or by request, the electronic device 601 may request the external electronic device to perform at least some of the functions related to the functions or services, in addition to or instead of performing the functions or services by itself. The external electronic device receiving the request may carry out the requested function or the additional function and transmit the result to the electronic device 601. The electronic device 601 may provide the requested functions or services based on the received result as is or after additionally processing the received result. To this end, for example, a cloud computing, distributed computing, or client-server computing technology may be used.

Figure 7:
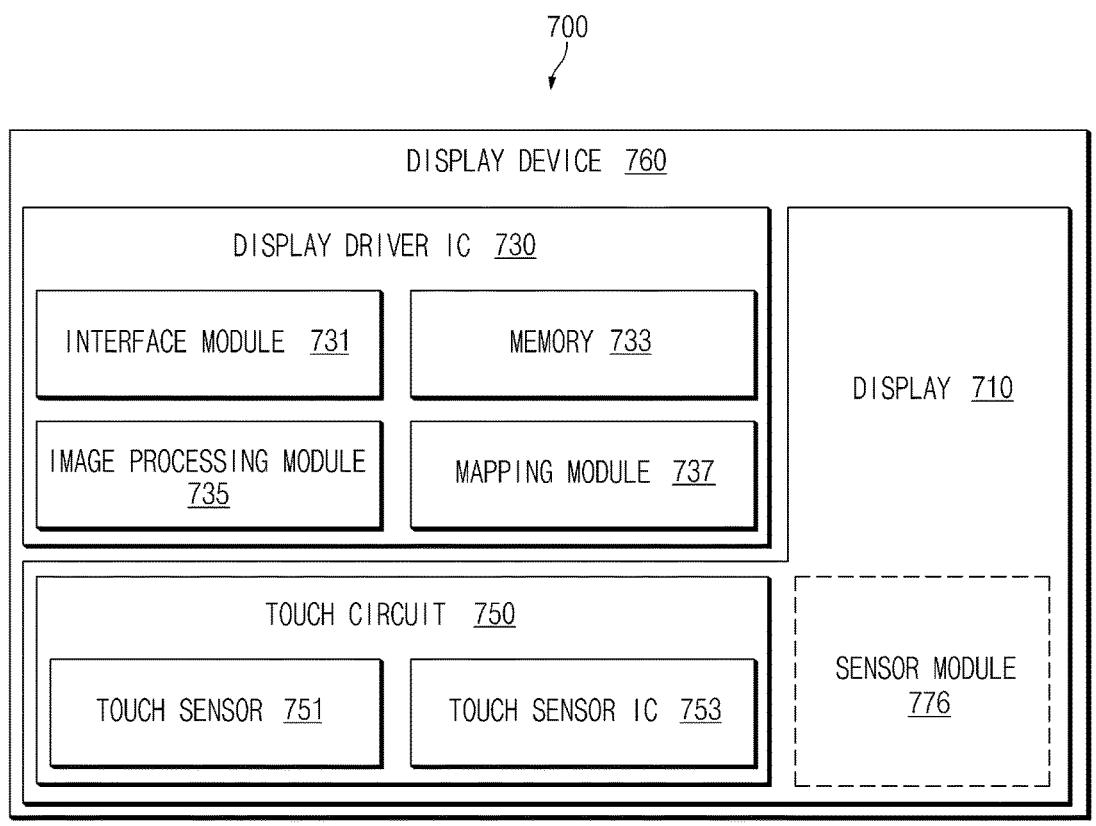
FIG. 7 illustrates, in block diagram format a display device according to various embodiments.

FIG. 7 illustrates, in block diagram format, a display device according to various embodiments.

Referring to the non-limiting example of FIG. 7, a display device 760 may include a display 710, and a display driver IC (DDI) 730 for controlling the display 710. The DDI 730 may include an interface module 731, a memory 733 (e.g., a buffer memory), an image processing module 735, or a mapping module 737. The DDI 730 may receive image information including image data or an image control signal corresponding to a command for controlling the image data, for example, from the processor 620 (e.g., the main processor 621) (e.g., an application processor) or the coprocessor 623 operated independently of a function of the main processor 621 through the interface module 731. The DDI 730 may communicate with a touch circuit 750 or the sensor module 776 through the interface module 731. Also, the DDI 730 may store at least a portion of the received image information in the memory 733, for example, by the frame. The image processing module 735 may perform pre-processing or post-processing (e.g., resolution, brightness, or size adjustment) on at least a portion of the image data, for example, based on a characteristic of the image data or a characteristic of the display 710. The mapping module 737 may convert the image data pre-processed or post-processed through the image processing module 735 to a voltage value or a current value capable of driving pixels in the display 710, based at least partly on attributes (e.g., the arrangement (an RGB stripe or PENTILE™) of the pixels or the size of each of sub-pixels) of the pixels. When at least a part of the pixels in the display 710 is driven, for example, based on the voltage value or the current value, visual information (e.g., a text, an image, or an icon) corresponding to the image data may be displayed in the display 710.

According to various embodiments, the display device 760 may further include the touch circuit 750. The touch circuit 750 may include a touch sensor 751 and a touch sensor IC 753 for controlling the touch sensor 751. The touch sensor IC 753 may control the touch sensor 751, for example, to sense a touch input or a hovering input associated with a specific location by measuring a change of a signal (e.g., a voltage, the amount of light, a resistance value, or the amount of charges) associated with the specific location of the display 710, and may provide information (e.g., a location, the area, or a time) about the sensed touch input or hovering input to the processor 620. According to some embodiments, at least a part (e.g., the touch sensor IC 753) of the touch circuit 750 may be included as a part of the display driver IC 730 or the display 710, or as a part of any other component (e.g., the coprocessor 623) positioned on the outside of the display device 760.

According to certain embodiments, the display device 760 may further include at least one sensor (e.g., a fingerprint sensor, an iris sensor, a pressure sensor, or an illuminance sensor) in the sensor module 776, or a control circuit associated with the at least one sensor. In this case, the at least one sensor or the control circuit associated with the at least one sensor may be embedded in a part (e.g., the display 710 or the DDI 730) of the display device 760 or in a part of the touch circuit 750. For example, in the case where the sensor module 776 embedded in the display device 760 includes a biometric sensor (e.g., a fingerprint sensor), the biometric sensor may obtain biometric information (e.g., a fingerprint image) associated with a touch input through a partial region of the display 710. For another example, in the case where the sensor module 776 embedded in the display device 760 includes a pressure sensor, the pressure sensor may obtain pressure information associated with a touch input through a partial region or the whole region of the display 710. According to various embodiments, the touch sensor 751 or the sensor module 776 may be positioned between pixels of a pixel layer of the display 710 or above or below the pixel layer.

The electronic device according to various embodiments disclosed in the present disclosure may be one of various types of devices. The electronic device may include, for example, at least one of a portable communication device (e.g., a smartphone), a computer device, a portable multimedia device, a mobile medical appliance, a camera, a wearable device, or a home appliance. The electronic device according to some embodiments of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 640) including an instruction stored in a machine-readable storage media (e.g., an internal memory 636 or an external memory 638) readable by a machine (e.g., a computer). The machine may be a device that calls the instruction from the machine-readable storage media and operates depending on the called instruction and may include the electronic device (e.g., the electronic device 601). When the instruction is executed by the processor (e.g., the processor 620), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to certain embodiments, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a PLAY STORE™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a housing including a first surface, a second surface facing away from the first surface, and a side surface surrounding a space between the first surface and the second surface;
   a display panel exposed through the first surface;
   a clock generator positioned within the housing, and configured to generate a first clock;
   a first processor configured to generate first image data and to transmit the first image data based on the first clock;
   a graphic RAM configured to receive the first image data from the first processor and to store the first image data;
   a controller electrically connected with the graphic RAM, and configured to select at least a portion of the first image data stored in the graphic RAM and to output the selected portion of the first image data on the display panel;

an antenna element including at least a portion of the housing or positioned within the housing;
a second processor configured to feed the antenna element and to transmit or receive a signal in a first frequency band based on an electrical path formed through the antenna element; and
a memory configured to store state data indicating whether a frequency band of a signal which the second processor transmits or receives is changed,
wherein the first processor is configured to:
allow the electronic device to enter a first state, in which at least a part of the first processor is turned off, based on a number of frames through which the selected portion of the first image data is output;
generate second image data when a specified condition for outputting the second image data is satisfied;
perform a determination to obtain a result of whether the second processor transmits or receives a signal in a second frequency band, based on the state data;
set a second clock through the clock generator, when the determination result indicates that the frequency band of the signal which the second processor transmits or receives is changed;
allow the electronic device to enter a second state in which the at least a part turned off is turned on;
transmit the second image data to the graphic RAM based on the second clock in the second state; and
output at least a portion of the second image data on the display panel through the controller,
wherein the second clock is mapped onto the second frequency band.

2. The electronic device of claim 1, wherein the first processor is configured to:
allow the electronic device to enter the first state when the number of frames is not smaller than a specified number.

3. The electronic device of claim 1, wherein the first processor includes:
a display controller configured to generate the first image data;
a transmit module configured to transmit the first image data to the graphic RAM; and
a display controller driver electrically connected with the display controller and the transmit module.

4. The electronic device of claim 3, wherein the display controller driver is configured to:
turn off the display controller and the transmit module when the electronic device enters the first state.

5. The electronic device of claim 3, wherein the display controller driver is configured to:
generate the second image data and set the second clock, when the electronic device enters the first state.

6. The electronic device of claim 3, wherein the display controller driver is configured to:
turn on the display controller and the transmit module when the electronic device enters the second state.

7. The electronic device of claim 3, wherein, in the second state, the transmit module transmits the second image data to the graphic RAM based on the second clock.

8. The electronic device of claim 1, wherein the memory is configured to:
store a table in which clocks to be generated by the clock generator are mapped onto frequency bands of a signal to be transmitted/received by the second processor.

9. The electronic device of claim 8, wherein the first processor is configured:
set the second clock based on the table.

10. The electronic device of claim 1, wherein the first processor corresponds to an application processor, and
wherein the second processor corresponds to a communication processor.

11. The electronic device of claim 1, wherein the first processor is configured to:
generate the second image data based on a user input for outputting the second image data.

12. An electronic device comprising:
a housing including a first surface, a second surface facing away from the first surface, and a side surface surrounding a space between the first surface and the second surface;
a display panel exposed through the first surface;
a clock generator positioned within the housing, and configured to generate a first clock;
a first processor configured to generate first image data and to transmit the first image data based on the first clock;
a graphic RAM configured to receive the first image data from the first processor and to store the first image data;
a controller electrically connected with the graphic RAM, and configured to select at least a portion of the first image data stored in the graphic RAM and to output the selected portion of the first image data on the display panel;
a plurality of antenna elements including at least a portion of the housing or positioned within the housing;
a second processor configured to feed at least some of the antenna elements and to transmit or receive first group signals based on electrical paths respectively formed through the fed antenna elements; and
a memory configured to store state data indicating whether a frequency band of signals which the second processor transmits or receives is changed,
wherein the first processor is configured to:
allow the electronic device to enter a first state, in which at least a part of the first processor is turned off, based on a number of frames through which the selected portion of the first image data is output;
generate second image data when a specified condition for outputting the second image data is satisfied;
perform a determination to obtain a result of whether the second processor transmits or receives second group signals, based on the state data;
set a second clock through the clock generator, when the determination result indicates that the frequency band of the signals which the second processor transmits or receives is changed;
allow the electronic device to enter a second state in which the at least a part turned off is turned on;
transmit the second image data to the graphic RAM based on the second clock in the second state; and
output at least a portion of the second image data on the display panel through the controller,
wherein the second clock is mapped onto a frequency band of each of the second group signals.

13. The electronic device of claim 12, wherein the side surface includes a first edge facing a first direction and having a first length, a second edge being in parallel with the first edge and having the first length, a third edge connecting one end of the first edge and one end of the second edge, and a fourth edge being in parallel with the third edge and connecting an opposite end of the first edge and an opposite end of the second edge, and wherein the antenna elements include a first antenna element including at least a portion of the first edge, and a second antenna element including at least a portion of the second edge.

14. The electronic device of claim 13, wherein the second processor transmits or receives a signal in a first frequency band based on a first electrical path formed through the first antenna element, and transmits/receives a signal in a second frequency band based on a second electrical path formed through the second antenna element.

15. The electronic device of claim 12, further comprising:
a camera module interposed between the first surface and the second surface,
wherein the antenna elements include a coil-type antenna element surrounding the camera module.

16. The electronic device of claim 12, wherein the first processor includes:
a display controller configured to generate the first image data;
a transmit module configured to transmit the first image data to the graphic RAM; and
a display controller driver electrically connected with the display controller and the transmit module.

17. The electronic device of claim 16, wherein the display controller driver is configured to:
turn off the display controller and the transmit module when the electronic device enters the first state.

18. An electronic device comprising:
a housing including a first surface, a second surface facing away from the first surface, and a side surface surrounding a space between the first surface and the second surface;
a display panel exposed through the first surface;
at least one processor configured to generate a first clock and first image data and to transmit the first image data based on the first clock;
a graphic RAM configured to receive the first image data from the processor and to store the first image data;
a controller electrically connected with the graphic RAM, and configured to select at least a portion of the first image data stored in the graphic RAM and to output the selected portion of the first image data on the display panel; and
an antenna element including at least a portion of the housing or positioned within the housing, and electrically connected with the at least one processor,
wherein the at least one processor is configured to:
feed the antenna element;
transmit or receive a signal based on an electrical path formed through the antenna element;
allow the electronic device to enter a first state, in which at least a part of the processor is turned off, based on a number of frames through which the selected portion of the first image data is output;
generate second image data when a specified condition for outputting the second image data is satisfied;
perform a determination to obtain a result of whether a frequency band of the signal is changed;
set a second clock when the determination result indicates that the frequency band of the signal is changed;
allow the electronic device to enter a second state in which the at least a part turned off is turned on;
transmit the second image data to the graphic RAM based on the second clock in the second state; and
output at least a portion of the second image data on the display panel through the controller,
wherein the second clock is mapped onto the changed frequency band.

19. The electronic device of claim 18, wherein the at least one processor includes at least one of an application processor and a communication processor.

20. The electronic device of claim 18, wherein the at least one processor includes:
a clock generator configured to generate the first clock and the second clock.

* * * * *